United States Patent [15] 3,675,126
Chilton [45] July 4, 1972

[54] COMMUTATED MOTOR SPEED MEASURING MEANS

[72] Inventor: Charles B. Chilton, Baltimore, Md.
[73] Assignee: The Bendix Corporation
[22] Filed: Oct. 29, 1970
[21] Appl. No.: 85,012

[52] U.S. Cl. .................................324/168, 324/177, 317/5
[51] Int. Cl. .......................................................G01p 3/48
[58] Field of Search ............324/173, 174, 177, 168; 371/5; 318/490, 309

[56] References Cited

UNITED STATES PATENTS 3,346,725 10/1967 Allured...................................324/177
3,439,245 4/1969 Perdue....................................318/490

OTHER PUBLICATIONS

E. Bukstein– Industrial Electronics Measurement and Control– H. W. Sams Co. Inc.– 1961– pp. 63, 73–75, 82

Primary Examiner—Michael J. Lynch
Attorney—Plante, Hartz, Smith & Thompson, Bruce L. Lamb and William G. Christoforo

[57] ABSTRACT

A device for measuring the speed of a commutated electric motor such as a d-c or universal motor uses a current transformer and band-pass filter for sensing power line perturbations caused by motor commutation. The sensed perturbations trigger a one-shot whose ON time with respect to total time is taken as a measure of motor speed. When a universal motor is powered by an a-c power source, a synchronous gating circuit is used to blank the measuring circuit near the zero crossings of the power line. A full wave level detector senses when instantaneous line voltage drops below a preset threshold level and at that time qualifies the synchronous gating circuit. The gating circuit is not actually opened, however, until a subsequent perturbation is detected, at which time motor speed measurement is suspended. When instantaneous line voltage now rises above the threshold level, the synchronous gating circuit is qualified to close but will not close until a second subsequent power line perturbation is detected.

10 Claims, 3 Drawing Figures

INVENTOR
CHARLES B. CHILTON
BY
William G. Christoforo
ATTORNEY

COMMUTATED MOTOR SPEED MEASURING MEANS

BACKGROUND OF THE INVENTION

This invention relates generally to electric motor rotational speed measuring devices and more particularly to such devices for measuring the speed of a commutated electric motor.

There is a need to measure the rotational speed of both universal and d-c electric motors without connecting a transducer to the motor or otherwise placing a sensor next to or in proximity with the output shaft of the motor. Furthermore, in many cases the actual motor output shaft is not accessible. Additionally, the output motion of various electrically powered devices can be other than rotary. For example, the output motion of an electrically powered tool may be rotary, orbital, or reciprocating depending on the type of tool. A special sensor will thus be required for each type. In addition, a special attachment for positioning of the sensor with respect to the motor driven device might also be required.

It is known that the commutator of an electric motor modulates the amplitude of the current drawn by the motor. The frequency of this modulated signal is a function of motor speed and the number of commutator segments. Knowing this fact, it would appear to be merely necessary to sense the power line current perturbations caused by commutation of the motor and to count these perturbations during a determinable time period to arrive at a measure of motor speed. However, when the speed of a commutated motor driven by an a-c power line, such as a universal motor, is to be determined, a second problem presents itself. Near the zero crossing of the power line, the perturbations caused by motor commutation may disappear completely or be obscured by commutation noise, such as would be caused by brush arcing. To eliminate the uncertainty of measurement near the zero-crossings it is necessary to sense these near zero-crossings and to suspend measurement at that time.

Of course, where a d-c power source is used to drive a universal or a d-c electric motor there will be no near zero crossings and motor speed measurement may proceed uninterrupted.

SUMMARY OF THE INVENTION

Accordingly, a circuit has been designed which will measure the speed of both universal and d-c electric motors accurately whether driven from a-c or d-c power lines. A current transformer or other audio frequency current transducer is placed in one side of the motor power line. The output of this current transducer is connected to a band-pass filter which removes the power line frequency (if an a-c power line) and the voltage spikes caused by brush arcing. The output of the band-pass filter is an audio frequency signal having a frequency directly proportional to motor speed. The audio frequency is amplified, limited and differentiated to provide a train of trigger pulses at the pulse repetition frequency of the audio signal for a one-shot. In addition, a small amount of hysteresis is provided to prevent false triggering of the one-shot. The one-shot provides a constant width output pulse regardless of input trigger repetition frequency so that the output duty cycle is directly proportional to input frequency, and hence motor speed, over the operating range of the device.

To measure the aforementioned one-shot output duty cycle, a pair of gating means is provided in addition to a charge storage device. During the one-shot triggered output pulse the first gating means is opened to allow charges to flow into the charge storage device. During the one-shot quiescent period the second gating means is opened to permit charges to flow out of the charge storage device. The voltage stored across the charge storage device, as seen through a ripple filter, is a measure of motor speed.

To prevent the circuit from measuring near the zero crossing of the power line both gating means are opened to prevent movement of charges at the charge storage device during this period. This is accomplished by a full wave level detector which senses when the instantaneous line voltage drops below a predetermined threshold. A subsequent trigger pulse then opens both aforementioned gating means. When instantaneous line voltage rises above the threshold, as determined by the full wave level detector, a subsequent trigger pulse returns the gating means to normal operation. Thus, the start of both measure and hold periods are synchronized with the one-shot trigger pulses. This insures that the charge storage device will receive an equal and whole number of charge and discharge periods and eliminates any error that would result due to the relative phase of the commutator signal and the level detector output signal.

It is thus an object of this invention to provide a single device for measuring the rotational speed of a commutated electrical motor driven by either an a-c or d-c power source.

It is another object of this invention to provide a measuring device of the type described which does not make use of transducers connected to or in close proximity to the motor output shaft.

It is a further object of this invention to provide a motor speed measuring means of the type described which makes use solely of electrical principles.

These and other objects and features of the invention are described in the following description in terms of the embodiments thereof which are shown in the accompanying drawings. It is understood, however, that the embodiment described herein is for the purpose of illustration only and is not to be taken as a definition of the limits of the invention. Reference is to be had to the appended claims for this purpose.

DESCRIPTION OF THE PREFERRED EMBODIMENT

Figure 1:
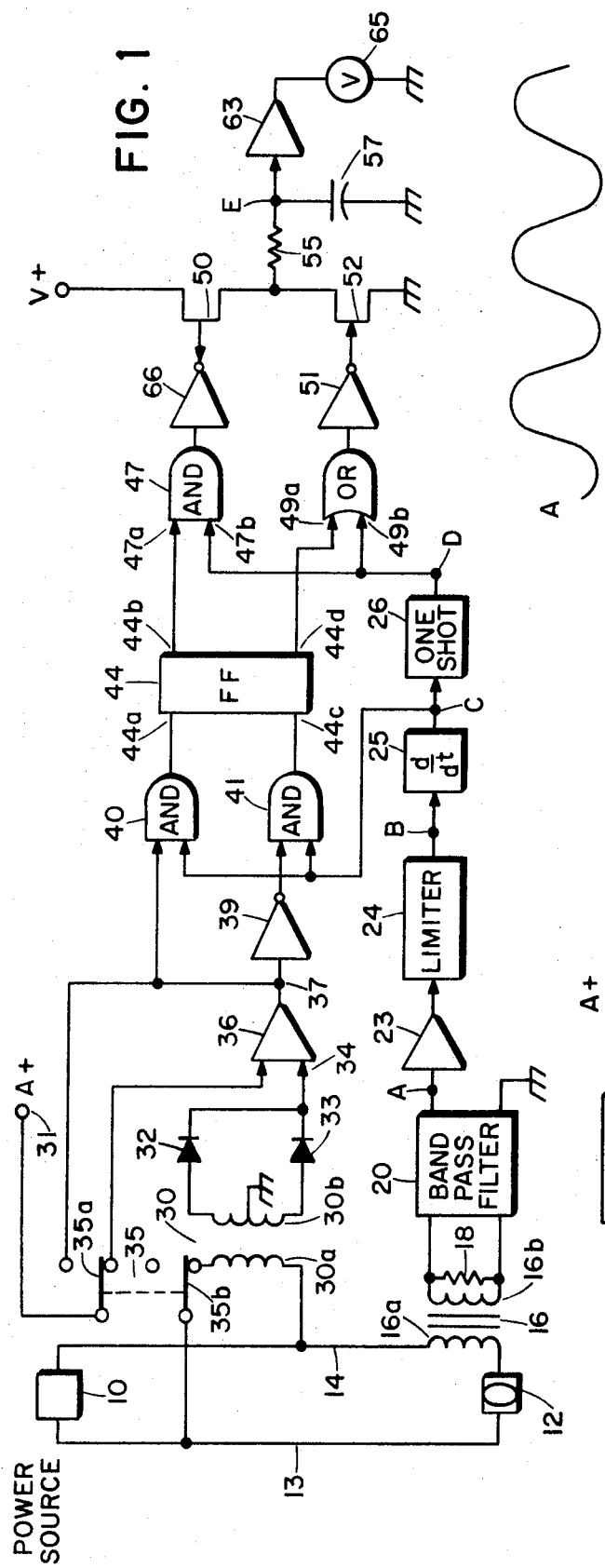
FIG. 1 is a modified block diagram of the invention.
Figure 2:
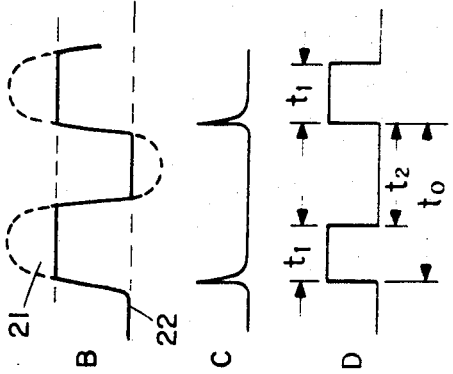
FIG. 2 shows waveforms of the signal as it appears at various points in the block diagram of FIG. 1, the various waveforms being drawn to a common time scale.

Referring first to FIG. 1 there is seen a power source 10, suitably either an a-c or d-c power source, supplying electrical power to the commutated electric motor 12 via electric transmission lines 13 and 14. An audio frequency current transducer, suitably current transformer 16, has a primary winding 16a serially connected in power line 14 to sense current flow therein and hence through electric motor 12. The impedance presented by winding 16a is characteristically very low to avoid disturbance of the electric motor power supply. Transducer 16 senses perturbations in the current flow to electric motor 12, these perturbations being caused by motor commutation effects, brush arcing, power line frequency etc. The transformer secondary winding 16b, having a transformer resistive load 18 shunted thereacross, senses these perturbations and provides a voltage signal across resistor 18 in accordance therewith. A band-pass filter 20 senses this voltage signal and allows frequencies close to those expected from consideration of probable motor speeds and commutator configuration to be passed. High frequency signals which are normally generated by brush arcing and relatively low frequencies related to power line frequencies are attenuated. The band-pass filter output appears at terminal A. The waveform of the signal at this point can be seen at FIG. 2A and is a generally sinusoidal waveform having a frequency related to the speed of electric motor 12. This signal is applied sequentially to amplifier 23 and limiter 24, the output of the limiter appearing at terminal B, the waveform at that terminal being illustrated at FIG. 2B. It can be seen that the waveform has now been amplified and limited at levels 21 and 22 to produce an essentially square waveform. This square waveform is processed by the differentiator 25 to produce the train of sharp, spiked pulses at terminal C, which train of pulses is also seen at FIG. 2C. In this embodiment, only the positive going pulses are utilized. These pulses are applied to one-shot 26 to trigger that element to generate a train of its characteristic output pulses. This pulse train appears at terminal D and is seen in FIG. 2D. As is well known, the output pulse from one-shot 26 is a pulse whose duration $t_1$ depends on the characteristics of the circuit and which is constant from one pulse to the other. It should also be obvious that the pulses $t_1$ occur at the pulse repetition frequency of the input waveform at terminal A, which it will be remembered is related to motor speed.

With power source 10 an a-c power source and a universal motor connected at motor 12, switch 35, having switch elements 35a and 35b, is connected as shown, that is with element 35b connecting the high impedance primary winding 30a of transformer 30 across power lines 13 and 14 and with element 35a connecting a source of A+ voltage (not shown) at terminal 31 to one input tap of comparator 36. Transformer 30 includes split secondary winding 30b having a grounded center tap and arranged in a half bridge configuration with diodes 32 and 33 whose cathodes are connected in common at terminal 34, the other input tap of comparator 36. A positive voltage signal will be present at terminal 34 only when the voltage level across the power lines 13 and 14 is high enough, as sensed by transformer 30, to forward bias the diodes. Additionally, comparator 36 will generate an output at its output terminal 37 only when the voltage at its input terminal 34 exceeds the voltage at its other input terminal. The elements of this portion of the invention, which can aptly be termed a level detector, can obviously be chosen to provide a threshold value which the voltage across line 13 and 14 must exceed in order to cause an output at terminal 37. It can also be seen that a period of no signal at terminal 37 will occur near the zero crossings of the power source. As stated, above this threshold a signal appears at terminal 37 and is applied directly to qualify AND gate 40 and through inverter 39 to disqualify AND gate 41. A signal generated by AND gate 40 is applied to input tap 44a of flip-flop 44 resulting in a flip-flop generated signal at output terminal 44b together with the extinguishment of any signal then present at flip-flop output terminal 44d. An AND gate 41 generated output signal is applied to flip-flop input terminal 44c to cause the flip-flop to generate an output signal at output terminal 44d and to extinguish any signal then appearing at output terminal 44b.

Assuming now that flip-flop 44 is in a first state wherein a signal is being generated at terminal 44b, this signal is applied to input terminal 47a of AND gate 47 to thus qualify that gate. A subsequent trigger pulse at terminal C triggers one-shot 26 to generate its output pulse which is applied to the now qualified gate 47 and through inverter 66 to P channel field effect transistor 50 to thus render that transistor's drain source circuit conductive during the period of the one-shot output pulse. It can be seen that the drain-source circuit of FET 50 is serially connected with the drain-source circuit of N channel FET 52 across a d-c reference voltage supply designated V+. The one-shot output pulse is applied to OR gate 49 input terminal 49b. In response thereto the OR gate generates an output which is applied through inverter 50 to the gate electrode of FET 52 to thereby render that transistor's drain-source circuit nonconductive.

The common connection between transistors 50 and 52 is connected to terminal E through resistor 55 with capacitor 57 being connected between terminal E and ground. Terminal E is connected to the input terminal of buffer amplifier 63 which has a characteristically high input impedance to prevent loading of the circuit consisting of resistor 55 and capacitor 57. This circuit accordingly acts as a charge storage device to store charges delivered by transistor 50 when that transistor is conductive or deliver the charges to transistor 52 when that transistor is conductive or to hold charges when neither transistor is conductive. Additionally, this filter circuit provides filtering between the common connection of transistors 50 and 52 and terminal E to remove any ripple which might otherwise appear at terminal E. During the one-shot 26 quiescent time the signals at input terminals 47b and 49b are removed to thus extinguish the AND gate 47 output signal to thereby deenergize transistor 50. At the same time the signal from OR gate 49 is extinguished to thus render transistor 50 conductive across its drain-source circuit. Charges now stored in the charge storage circuit will tend to drain to ground. The filter circuit results in a speed signal in the form of a voltage at terminal E which is a measure of motor speed. The speed signal is impressed, through buffer amplifier 63, across voltmeter 65. The voltmeter is suitably calibrated, by methods well known to those skilled in the art, to read directly in motor rotational speed.

As aforementioned, at near-zero crossings of the power source, the signal at terminal 37 is extinguished thus disqualifying AND gate 40 and qualifying AND gate 41 through inverter 39. A subsequent trigger pulse at terminal C not only triggers one-shot 26 but is also now applied through AND gate 41 to flip-flop input terminal 44c thus extinguishing the signal at output terminal 44b and generating an output signal at output terminal 44d. AND gate 47 is thereby disqualified so that transistor 50 becomes nonconductive. Additionally, the signal at OR gate input terminal 49a causes transistor 52 to also be nonconductive. Hence, during this time, that is at the near-zero crossings of the power source, no charges will flow into or out of the charge storage device, so that the voltage impressed thereacross is held.

When the power line voltage again rises above the threshold, the signal is reestablished at terminal 37. This, of course, disqualifies AND gate 41 and qualifies AND gate 40. A subsequent trigger pulse at terminal C will now pass through AND gate 40 to input terminal 44a to once again return the speed measuring circuit to its normal measuring mode wherein the output signals from one-shot 26 control the charge and discharge of the charge storage device.

For use with a d-c power source where near-zero crossings need not be considered, it is merely necessary to turn switch 35 to its second position, that is, with element 35b now disconnecting winding 30a from the power line and with element 35a connecting the A+ voltage directly to terminal 37. This permits the speed measurement to be made in a manner identical to that previously described, except that no measurement hold periods are introduced.

Figure 3:
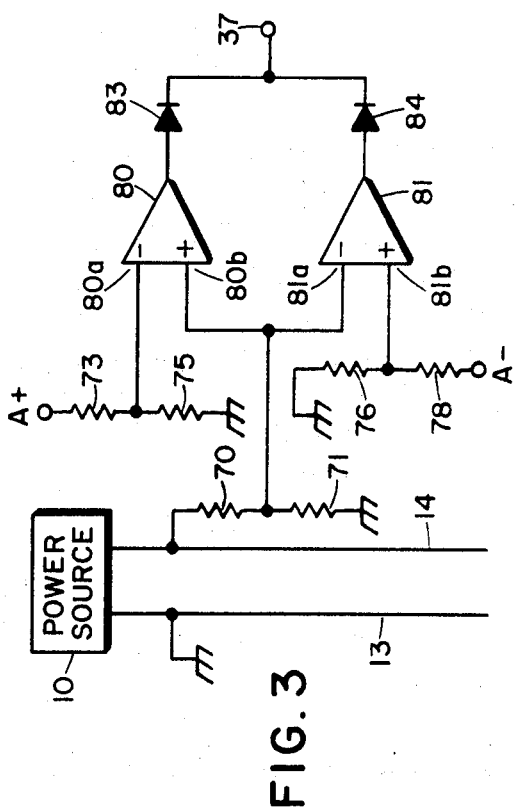
FIG. 3 shows an alternate form of level detector used with the invention.

FIG. 3 shows an alternate type of level detector which does not require a switch, such as switch 35 of FIG. 1, to operate the speed measuring means with either a-c or d-c motors. Referring to FIG. 3, the power source 10 here may be either an a-c or d-c source supplying lines 13 and 14, seen also in FIG. 1. Line 13 is the grounded line. A voltage divider is comprised of resistors 70 and 71 serially connected between line 14 and ground. A second voltage divider is comprised of resistors 73 and 75 serially connected between a source of A+ voltage (not shown) and ground while a third voltage divider is comprised of resistors 76 and 78 serially connected between a source of A− voltage (not shown) and ground. The intermediate point of the first divider is connected to input port 80b of comparator 80 and input port 81a of comparator 81. The intermediate point of the second divider is connected to input port 80a while the intermediate point of the third divider is connected to input port 81b. The outputs of comparators 80 and 81 are connected, respectively, to the anodes of diodes 83 and 84. The diode cathodes are connected together and to terminal 37, seen here and in FIG. 1.

A positive voltage reference is thus set at port 80a while a negative voltage reference is set at port 81b. Whenever the voltage at line 14, as sensed through the first divider, is above the positive reference, comparator 80 generates an output through diode 83 onto terminal 37. In like manner, whenever the voltage at line 14, as sensed through the first divider, is below the negative reference, comparator 81 generates an output through diode 84 onto terminal 37. When the sensed voltage is between the positive and negative references, no signal appears at terminal 37. It should now be obvious that with power supply 10 an a-c supply, at near-zero crossings of the power line no signal will appear at terminal 37. When the voltage across lines 13 and 14 is not near zero, either with an a-c or d-c supply at power supply 10, a signal will appear at terminal 37. Thus, the level detector of FIG. 3 will operate in an identical manner as the level detector and switch 35 of FIG. 1 to permit accurate rotational speed measurement of the motor under test.

Although this invention is shown and described herein in particularity, it is to be understood that various changes in the invention may appear to those skilled in the art without departing from the true spirit of the invention. Thus, reference is to be had to the appended claims for a definition of the scope of invention.

The invention claimed is:

1. Means for measuring the rotational speed of a commutated electric motor energized from a power line whereon current perturbations having a repetition frequency proportional to rotational speed of said motor appear, comprising:
    means sensing said current perturbations for generating a train of pulses at the repetition frequency of said perturbations;
    level detector means for generating a hold signal when the voltage across said power line drops below a preset threshold and for extinguishing said hold signal when the voltage across said power line is above said preset threshold; and,
    means responsive to said pulse train for generating an output signal correlated to said repetition frequency while said hold signal is extinguished and for preserving said output signal while said output hold signal is generated.

2. Measuring means as recited in claim 1 wherein said last named means comprises:
    means responsive to said pulse train for generating an electrical voltage level correlated to said repetition frequency while said hold signal is extinguished and for maintaining said electrical voltage level while said hold signal is generated; and,
    utilization means responsive to said voltage level for providing an indication of said motor speed.

3. Means for measuring the rotational speed of an electrical motor having a commutator and energized from a power source via conductive means comprising:
    means sensing current perturbations in said conductive means for generating a first signal having repetition frequencies equal to the repetition frequencies of said perturbations;
    filter means for effectively removing from said first signal predetermined frequency ranges;
    means responsive to said filtered first signal for generating a train of pulses standardized as to pulse width at a repetition frequency proportional to the frequency of said filtered first signal;
    charge storage means;
    first means responsive to said pulses when in a first state for supplying charges to said charge storage means;
    second means responsive to said pulses when in a second state for removing charges from said charge storage means, the resultant voltage across said charge storage means being a measure of said rotational speed;
    means for generating a second signal when the voltage across said conductive means is below a preset threshold; and,
    means responsive to said second signal for deenergizing said first and second means so that charges are neither supplied to nor removed from said charge storage device while said voltage across said conductive means is below said preset threshold.

4. Means as recited in claim 3 wherein said train of pulses includes identifiable unique points and the last named means comprises:
    means responsive to a first of said identifiable unique points and said second signal for deenergizing said first and second means; and,
    means responsive to a second of said identifiable unique points and said second signal for subsequently energizing said first and second means.

5. Means as recited in claim 3 with additionally utilization means responsive to said resultant voltage for providing an indication of said rotational speed.

6. Measuring means as recited in claim 3 wherein said means for generating said train of standardized pulses comprises:
    means responsive to said filtered first signal for generating a train of trigger pulses at a repetition frequency proportional to the frequency of said filtered first signals; and,
    one-shot means triggered by said trigger pulses; and wherein said means for generating said second signal comprises
    means for generating said second signal when the voltage across said conductive means is below a preset threshold and for generating a third signal when the voltage across said conductive means exceeds said threshold;
    means responsive to said second signal and a subsequent one of said trigger pulses for deenergizing said first and second means; and,
    means responsive to said third signal and a subsequent second one of said trigger pulses for reenergizing said first and second means.

7. Means for measuring the rotational speed of an electric motor having a commutator and energized from a power source via conductive means comprising:
    means sensing current flow through said conductive means for generating a first signal having a first repetition frequency related to the repetition frequency of current perturbations;
    means for generating a train of pulses standardized as to pulse width and having a second repetition frequency related to said first repetition frequency;
    a charge storage means;
    first means responsive to said pulses when in a first state for supplying charges to said charge storage means;
    second means responsive to said pulses when in a second state for removing charges from said charge storage means, a resultant voltage across said charge storage means being a measure of said rotational speed
    means for generating a second signal when the voltage across said conductive means is above a preset threshold and for generating a third signal when the voltage across said conductive means is below said preset threshold;
    means responsive to said third signal and a subsequent pulse of said train of pulses for interrupting the response of said first and second means to said pulses; and
    means responsive to said second signal and a subsequent pulse of said train of pulses for reestablishing response of said first and second means to said pulses.

8. Means as recited in claim 7 with additionally utilization means responsive to said resultant voltage for providing an indication of said rotational speed.

* * * * *